(12) United States Patent
Murphy

(10) Patent No.: US 6,692,832 B2
(45) Date of Patent: Feb. 17, 2004

(54) ANTI-REFLECTIVE HYDROPHOBIC COATINGS AND METHODS

(75) Inventor: Nestor P. Murphy, Monroe, MI (US)

(73) Assignee: Guardian Industries Corporation, Auburn Hills, MI (US)

( * ) Notice: Subject to any disclaimer, the term of this patent is extended or adjusted under 35 U.S.C. 154(b) by 0 days.

(21) Appl. No.: 10/339,645

(22) Filed: Jan. 10, 2003

(65) Prior Publication Data

US 2003/0180544 A1 Sep. 25, 2003

Related U.S. Application Data

(60) Provisional application No. 60/366,528, filed on Mar. 25, 2002.

(51) Int. Cl.$^7$ .............................................. B32B 17/06
(52) U.S. Cl. ..................... 428/428; 428/426; 428/446; 428/448; 428/702; 428/687; 427/167
(58) Field of Search .................... 427/167; 428/426, 428/428, 446, 448, 702, 687

(56) References Cited

U.S. PATENT DOCUMENTS

| 4,274,856 A | | 6/1981 | Frey et al. |
| 5,372,851 A | | 12/1994 | Ogawa et al. |
| 5,691,011 A | * | 11/1997 | Newsham et al. ......... 428/1.31 |

FOREIGN PATENT DOCUMENTS

| EP | 0 476 510 A1 | 3/1992 | ............ C03C/17/42 |
| EP | 0 498 339 A1 | 12/1992 | ............ B05D/1/18 |

OTHER PUBLICATIONS

Abstract; XP002250670; R. Reulos; J Journal; Title—A new energy tensor; vol. 6; pp. 47–60, Jan. 1971.
Abstract; XP002250671; E.M. Dewan; J. Journal; Title—The magnetic field as a mechanism to preserve relativistic momentum; vol. 40; pp. 755–759, May. 1972.

* cited by examiner

Primary Examiner—Deborah Jones
Assistant Examiner—Andrew T Piziali
(74) Attorney, Agent, or Firm—Nixon & Vanderhye PC

(57) ABSTRACT

Substrates have anti-reflective hydrophobic surface coatings comprised of the reaction products of a vapor-deposited chlorosilyl group containing compound and a vapor-deposited alkylsilane. Most preferably the substrate is glass. In one preferred form of the invention, highly durable antireflective hydrophobic coatings may be provided by forming a silicon oxide anchor layer from a humidified reaction product of silicon tetrachloride, followed by the vapor-deposition of a chloroalkylsilane, preferably dimethyldichlorosilane (DMDCS). The layer thicknsses of the anchor layer and the overlayer are such that the coating exhibits light reflectance of less than about 1.5% (more preferably less than about 1.0%) at a wavelength of about 525 nm (+/–50 nm).

10 Claims, 3 Drawing Sheets

ANTI-REFLECTIVE HYDROPHOBIC COATINGS AND METHODS

CROSS-REFERENCE TO RELATED APPLICATION

Figure 1:
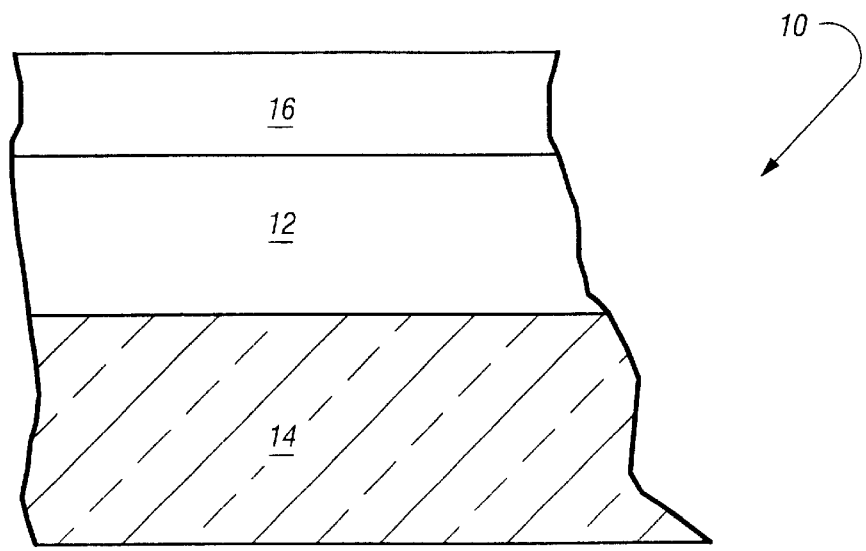
Figure 2:
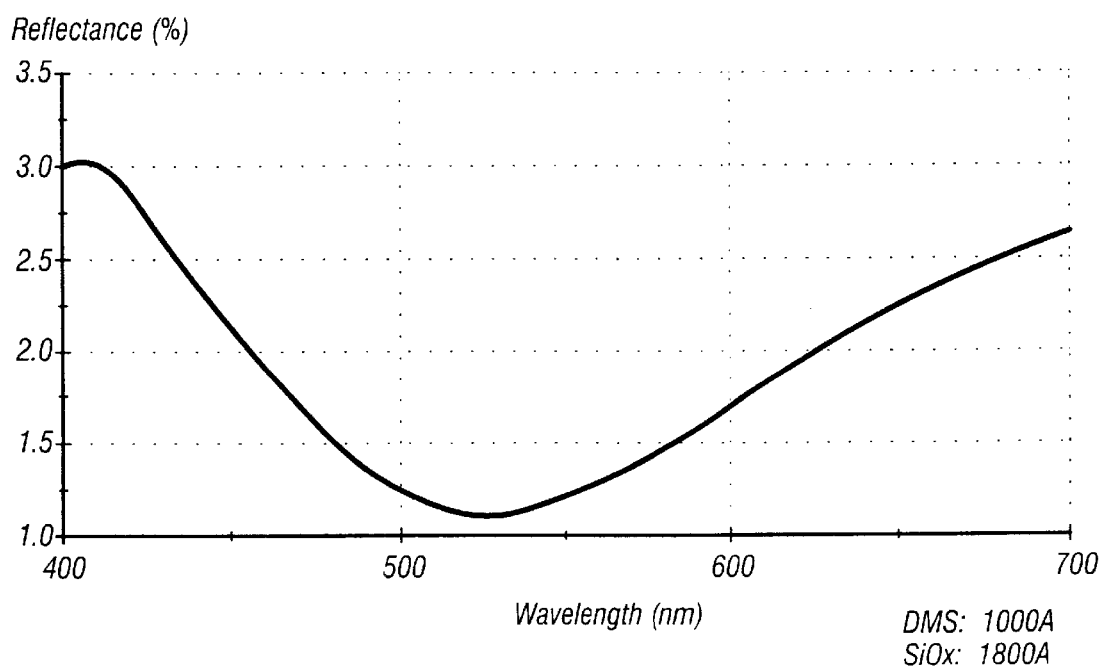
Figure 3:
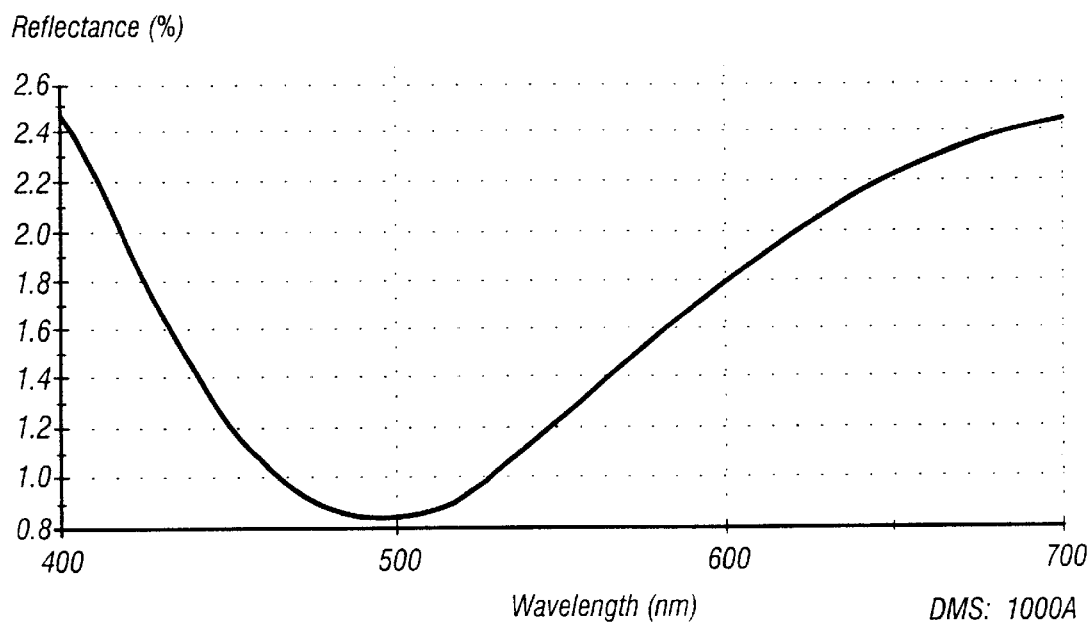
Figure 4:
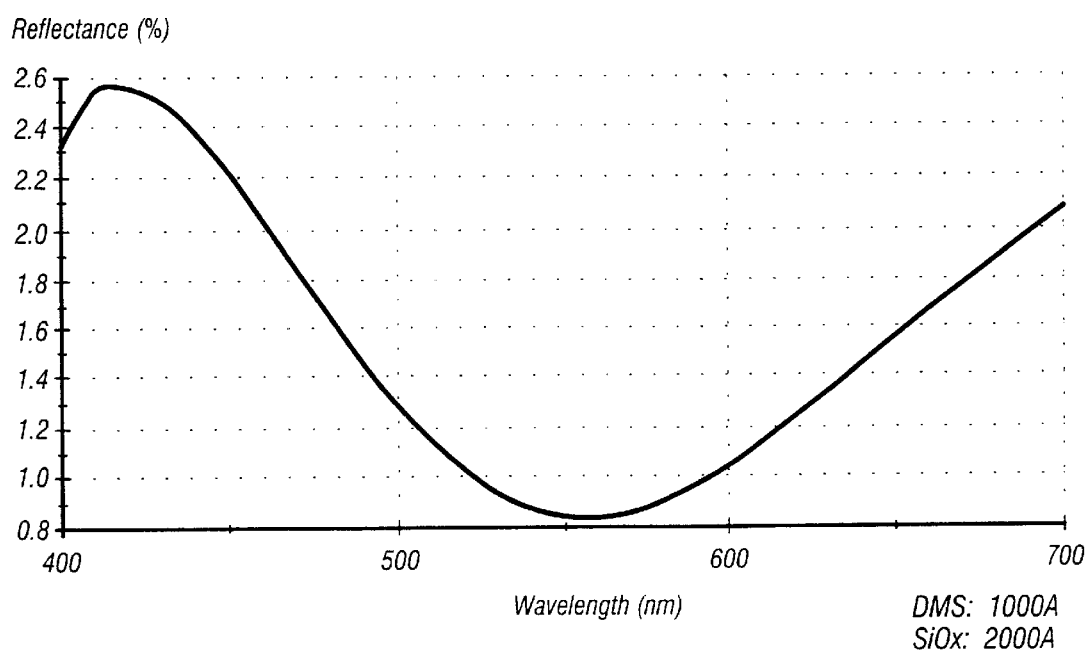
Figure 5:
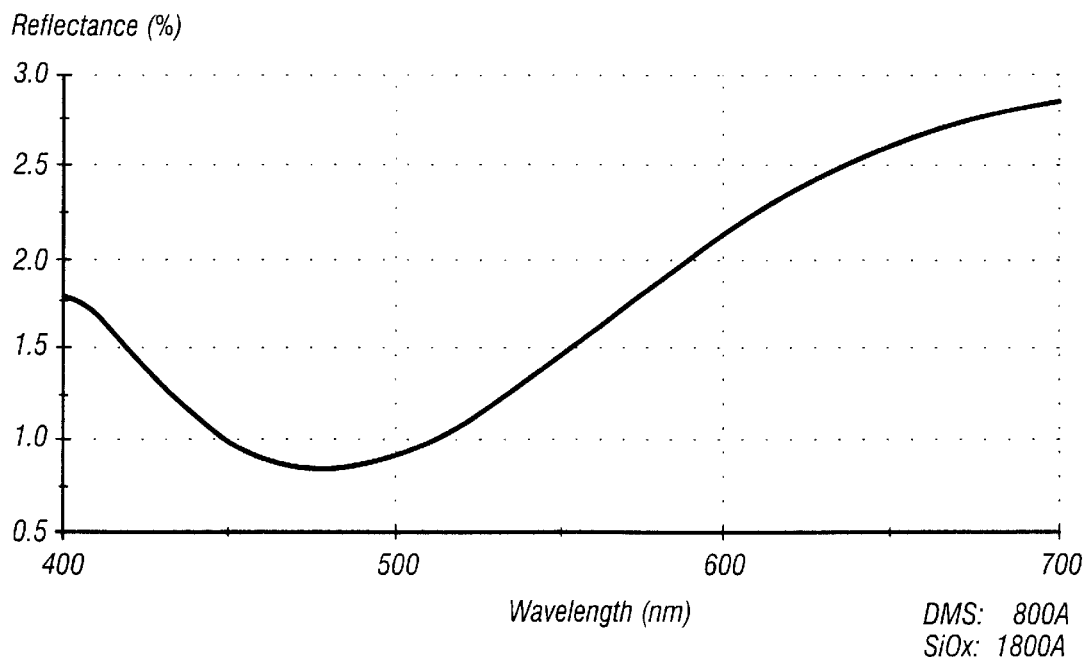
Figure 6:
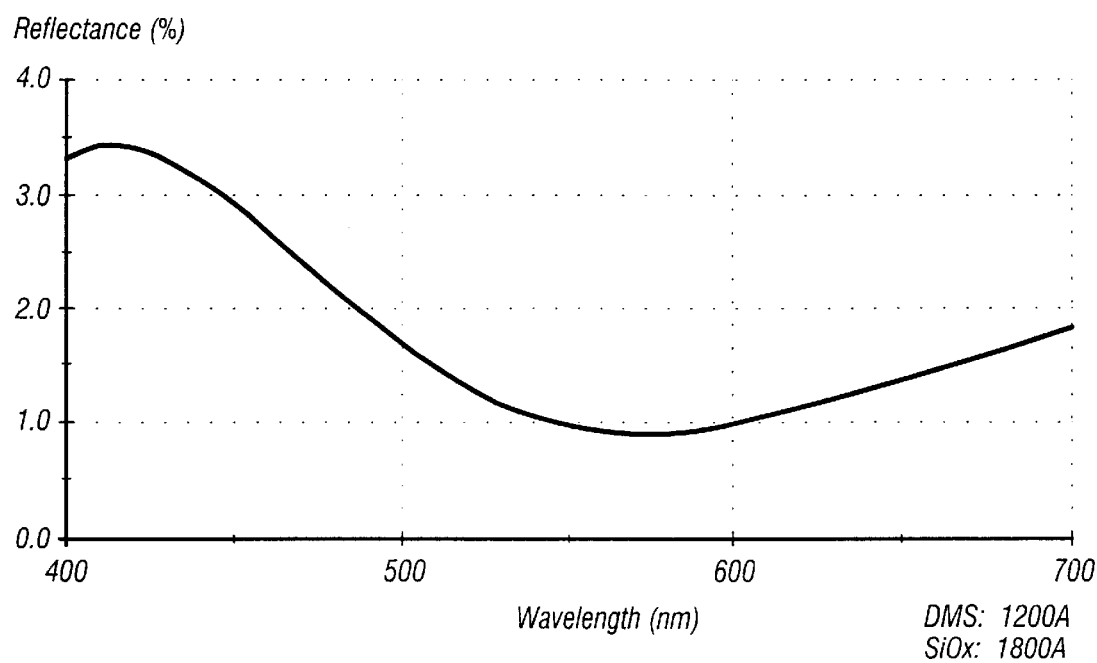

This application is based on, and claims domestic priority benefits under 35 U.S.C. § 119(e) from, U.S. Provisional Patent Application Serial No. 60/366,528 filed on Mar. 25, 2002, the entire content of which is expressly incorporated hereinto by reference.

FIELD OF THE INVENTION

The present invention relates generally to coated substrates and methods of coating the same. In preferred embodiments, the present invention relates to transparent substrates having an anti-reflective hydrophobic (water repellant) coating thereon.

BACKGROUND AND SUMMARY OF THE INVENTION

Glass is typically made of silicates that are melted to form a clear, transparent, solid material. The fundamental molecular structural unit of conventional glass is a $SiO_4$ tetrahedron. Ordinary float glass (named for its production process whereby a molten ribbon of glass is floated on molten metal to provide a smooth surface) includes additional amounts of soda ($Na_2O$), usually in the form of sodium carbonate or nitrate during the production process, lime (CaO) and other oxides (usually aluminum and magnesium oxides) to form a soda-lime-silica structure known colloquially as soda-lime glass. Other specialized glass can be prepared by the introduction of other additives and constituents.

It is sometimes highly desirable for conventional glass to have hydrophobic (water repellant) surface properties when employed in certain end-use applications, such as for automotive window glass. Various proposals exist to impart hydrophobic (water-repellant) properties to glass substrates. For example, U.S. Pat. Nos. 4,263,350, 4,274,856, 5,665,424 and 5,723,172 (the entire content of each being incorporated expressly hereinto by reference) disclose generally that glass surfaces can be coated with a vapor deposited layer of an chloroalkylsilane, such as dimethyldichlorosilane (DMDCS) so as to improve their hydrophobicity and/or release properties. Other proposals exist whereby a fluoroalkylsilane (FAS) coating may be employed to "cap" an underlayer on a glass substrate so as to improve coating durability. Please see in this regard, U.S. Pat. Nos. 5,328,768, 5,372,851, 5,380,585 and 5,580,605 (the entire content of each being incorporated expressly hereinto by reference). In addition, International Application WO 00/25938 (the entire content of which is expressly incorporated hereinto by reference) discloses that a silicon film consisting of chains of siloxane groups each terminating in an end molecule which reacts with water to form an OH group, may be capped by further reaction of that OH group with trimethylchlorosilane to form trimethylchlorosiloxane.

In commonly owned, U.S. patent application Ser. No. 09/921,303, filed on Feb. 1, 2001 (the entire content of which is expressly incorporated hereinto by reference) there are disclosed coated substrates (preferably glass) and methods which exhibit improved hydrophobicity and durability. In some of the especially preferred embodiments of the present invention, coated substrates and methods are provided which include an $SiO_x$-containing anchor layer comprised of a controllably humidified vapor phase deposition of a chlorosilyl group containing compound (most preferably silicone tetrachloride), and a hydrophobic capping layer chemically bonded to the $SiO_x$-containing anchor layer.

It has now been discovered that coated substrates of the type disclosed and claimed in the above-identified U.S. application Ser. No. 09/921,303 may also be rendered anti-reflective. Thus, according to one aspect of this invention, substrates may be provided with an anti-reflective hydrophobic surface coating comprised of the reaction products of a chlorosilyl group containing compound and an alkylsilane. Most preferably the substrate is glass. In one preferred form of the invention, highly durable hydrophobic coatings may be formed by forming a silicon oxide anchor layer from a humidified reaction product of silicon tetrachloride, followed by the vapor-deposition of a chloroalkylsilane, preferably dimethyldichlorosilane (DMDCS). The layer thicknesses of the anchor layer and the overlayer are such that the coating exhibits light reflectance of less than about 1.5% (more preferably less than about 1.0%) at a wavelength of about 525 nm (+/− about 50 nm).

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings wherein like reference numerals throughout the various FIGURES denote like structural elements, and wherein;

FIG. 1 is a schematic depiction of a coated glass substrate in accordance with the present invention; and FIGS. 2–6 are theoretical plots of reflectance (%) versus wavelength (nm) of a coated substrate having a structure shown in FIG. 1 at different $SiO_x$ base layer and DMDCS overlayer thicknesses.

DETAILED DESCRIPTION OF THE INVENTION

Virtually any substrate that is self-supporting and has, or may be induced to have, active surface hydrogen atoms may be coated in accordance with the present invention. Thus, rigid or flexible substrates formed of glass, plastics, ceramics and the like may be coated in accordance with the present invention. Most preferably, the substrate is glass, with conventional soda-lime float glass being especially preferred.

In one particularly preferred embodiment of a coated substrate 10 in accordance with the present invention as shown in FIG. 1, an anchor layer 12 comprised of a silicon oxide ($SiO_x$) is formed by vapor-deposition of a silicon-oxide forming compound onto a glass substrate 14 in a controllably humidified environment. In especially preferred forms of the invention, the silicon oxide layer may be obtained by the reaction of a compound having a chlorosilyl group, such as silicon tetrachloride ($SiCl_4$), with the surface of the glass to form an underlayer containing $SiO_4$. Other silanes that form silicon oxide may optionally, or additionally, be employed, such as hexachlorodisiloxane. When using silicon tetrachloride, it has been found that diluting 1 part the silicone tetrachloride with 10 parts pentane is particularly effective.

Vapor-phase silicon tetrachloride is most preferably introduced into a closed chamber having a controlled interior humidity environment which results in chlorine-terminated silicon oxide chains to attach directly to the glass substrate surface. Rehydrating the chlorine-terminated silicon oxide chains (e.g., by controlling the humidity in the chamber) will replace the terminal chlorine atoms with hydrogen atoms so that, upon the sequential introduction of vapor-phase chloroalkylsilanes with intermediate rehumidifcation of the chamber, such as dimethyldichlorosilane (DMDCS), a durable hydrophobic layer 16 over the $SiO_4$ anchor layer is obtained. Preferred alkylchloro silanes that may be used in accordance with the present invention are represented by the formula $Cl_xSiR_y$, where x is 1 to 3, y is 4–x, and R is an alkyl group.

The humidity during vapor-phase deposition of the silicon oxide anchor layer is important to achieve the desired end result of a durable hydrophobic coating on the substrate. In addition, controlled humidity during vapor phase deposition of the silicon oxide layer is important to achieve a coating with low haze characteristics. Thus, the humidity during vapor phase deposition of the silicon oxide anchor layer from silicon tetrachloride should be less than about 50% relative humidity, and advantageously less than about 45% relative. Preferably the relative humidity within the chamber is controlled to be about 40% or less. Thus, the silicon oxide layer will most preferably exhibit haze (non-specular light scattering) of less than about 3.0%, and typically less than about 2.0%. Advantageously, the haze of the silicon oxide layer will be less than about 1.5%, particularly less than about 0.8%.

The lower limit of relative humidity, and hence haze value, of the silicon oxide anchor layer is determined by the surface roughness that is desired. In this regard, it has been found that the greater the humidity, the greater the surface roughness of the resulting silicon oxide anchor layer and vice versa. Without wishing to be bound to any particular theory, it is believed that the surface roughness of the silicon oxide layer contributes materially to the durability of the hydrophobic coatings obtained according to the invention as the peaks and valleys of the "rough" anchor layer provides physical pockets where the later applied chloroalkylsilane can be deposited. In addition, a "rough" anchor layer of silicon oxide may provide an increased surface area resulting in the chloroalkylsilane being more dense per unit area on the substrate thereby possibly improving durability properties of the resulting coating.

The coated substrates of the present invention will exhibit a tilt angle (30 $\mu$L droplet size) of about 35° or less, and typically 30° or less. For some embodiments of the present invention, extremely low tilt angles of about 20° or less, or even about 10° or less, are obtainable. The coatings of the present invention are also highly durable. That is, the coated substrates of the present invention will exhibit a contact angle after 300 Taber abrasion cycles of greater than about 65°, and typically greater than about 70°. Even after 1000 Taber cycles, the coated substrates of the present invention will exhibit a contact angle of greater than about 60°, usually between about 65° to about 75°.

The coated substrates of the present invention can be conveniently produced using a closed reaction chamber configured to have an inlet opening for the chemical vapors, and a discharge opening to allow the chamber to be exhausted. The substrates are cleaned thoroughly and rinsed prior to being placed in the reaction chamber. The humidity within the chamber is controlled by the introduction of water vapor in dependence upon the chemical vapors being deposited. Thus, humidity within the reaction chamber of greater than about 10%, and less than about 80% are typically employed. The reaction chamber is most preferably maintained under ambient temperature (20° C.–25° C.) and atmospheric pressure (about 1.0 atmosphere) conditions during the vapor deposition of the underlayer and capping layer.

Important to the present invention are the respective thicknesses of the silicon oxide anchor layer and the vapor-deposited DMDCS overlayer. In this regard, the silicon oxide layer will most preferably be a layer obtained by vapor-depositing $SiCl_4$ and will exhibit an index of refraction of between about 1.42 to about 1.46 (typically about 1.44). The vapor-deposited DMDCS overlayer will typically exhibit an index of refraction of between about 1.28 to about 1.38 (typically about 1.35). The glass substrate will have an index of refraction of about 1.52 while air has an index of refraction of about 1.0. Thus, there exists according to the present invention a gradual decrease of the indices of refraction from the glass substrate to the air via the silicon oxide anchor layer and the DMDCS overlayer.

The relative thicknesses of the silicon oxide layer and the vapor-deposited DMDCS layers are selected so that substantially minimal reflectance is obtained at a light wavelength of about 525 nm (+/– about 50 nm). The reflectance advantageously will be less than about 1.5%, more preferably less than about 1.0%, at light wavelengths of about 525 nm (+/– about 50 nm). That is, according to the present invention, the term "anti-reflective" is meant to refer to coatings having light reflectance of less than about 1.5%, and more preferably less than about 1.0%, at wavelengths of between about 475 nm to about 575 nm. In this regard, thicknesses of the silicon oxide anchor layer of between about 1600 Å to about 2000 Å may be employed in the practice of the present invention, while thicknesses of the vapor-deposited DMDCS layer may range from about 800 Å to about 1200 Å. In an especially preferred embodiment, the thickness of the silicon oxide layer is about 1800 Å, while the thickness of the vapor-deposited DMDCS layer is about 1000 Å. As shown in FIGS. 2–6, such combinations of layer thicknesses will provide for minimal reflectance of less than about 1.5% at light wavelengths of about 525 nm (+/– about 50 nm).

It is contemplated that other transparent layers may be employed in the practice of the present invention. Thus, a layer may be interposed between the glass substrate and the silicon oxide anchor layer, provided that it exhibits an index of refraction which is between the indices of refraction exhibited by the silicon oxide layer and the glass substrate. Furthermore, a transparent layer may be interposed between the DMDCS overlayer and the silicon oxide, provided it exhibits an index of refraction which is between the indices of refraction exhibited by the DMDCS overlayer and the silicon oxide layer. And, as noted above, a capping layer may be applied over the DMDCS overlayer provided that such capping layer exhibits an index of refraction that is intermediate the indices of refraction of the DMDCS overlayer and air (1.0).

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transparent substrate which comprises an anti-reflective hydrophobic surface coating thereon, wherein said surface coating is comprised of an anchor layer of a vapor-deposited chlorosilyl group containing compound, and an overlayer of a vapor-deposited alkylsilane, wherein the anchor layer and overlayer have thicknesses sufficient such that the coating exhibits light reflectance of less than about 1.5% at a wavelength of about 525 nm (+/−50 nm).

2. The substrate of claim 1, wherein said anchor layer includes a layer of vapor-deposited silicon tetrachloride, and wherein said overlayer includes a layer of vapor-deposited dimethyldichlorosilane (DMDCS).

3. The substrate of claim 2, wherein the anchor layer includes a layer of $SiO_4$ having an index of refraction of between about 1.42 to about 1.46.

4. The substrate of claim 1 or 2, wherein the overlayer has an index of refraction of between about 1.28 to about 1.38.

5. The substrate of claim 3, wherein the thickness of the layer of $SiO_4$ is between about 1600 Å to about 2000 Å.

6. The substrate of claim 5, wherein the thickness of the DMDCS overlayer is between about 800 Å to about 1200 Å.

7. A glass substrate having an anti-reflective hydrophobic surface coating comprised of a silicon oxide anchor layer having a layer thickness of about between about 1600 Å to about 2000 Å, and a vapor-deposited dimethyldichborosilane (DMDCS) layer having a layer thickness of between about 800 Å to about 1200 Å, wherein the coating exhibits light reflectance of less than about 1.5% at a wavelength of between about 475 nm to about 575 nm.

8. The substrate of claim 7, wherein said silicon oxide layer has a thickness of about 1800 Å.

9. The substrate of claim 8, wherein said vapor-deposited DMDCS layer has a thickness of about 1000 Å.

10. The substrate of claim 9, wherein said light reflectance is less than about 1.5% at a wavelength of about 525 nm.

* * * * *